United States Patent
Kuppa et al.

(10) Patent No.: US 11,347,852 B1
(45) Date of Patent: *May 31, 2022

(54) IDENTIFYING WEB SHELL APPLICATIONS THROUGH LEXICAL ANALYSIS

(71) Applicant: Rapid7, Inc., Boston, MA (US)

(72) Inventors: Aditya Kuppa, Dublin (IE); Oliver Keyes, Seattle, WA (US); Joakim Kennedy, Belfast (IE); Ilya Biryukov, Dublin (IE)

(73) Assignee: Rapid7, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/443,651

(22) Filed: Jun. 17, 2019

Related U.S. Application Data

(63) Continuation of application No. 15/268,523, filed on Sep. 16, 2016, now Pat. No. 10,366,234.

(51) Int. Cl.
*G06F 21/52* (2013.01)
*G06F 21/57* (2013.01)
*G06F 21/56* (2013.01)
*G06N 20/00* (2019.01)
*H04L 29/06* (2006.01)

(52) U.S. Cl.
CPC .......... *G06F 21/565* (2013.01); *G06F 21/563* (2013.01); *G06F 21/566* (2013.01); *G06N 20/00* (2019.01); *G06F 2221/033* (2013.01)

(58) Field of Classification Search
CPC ..... G06F 21/565; G06F 21/563; G06F 21/566
USPC ......................................................... 726/25
See application file for complete search history.

(56) References Cited

U.S. PATENT DOCUMENTS

| | | | |
|---|---|---|---|
| 8,631,498 B1* | 1/2014 | Hart | H04L 63/145 726/25 |
| 8,838,992 B1* | 9/2014 | Zhu | G06F 21/563 713/186 |
| 9,088,598 B1* | 7/2015 | Zhang | H04L 63/1408 |
| 9,514,309 B1* | 12/2016 | Mann | G06F 21/565 |
| 9,690,938 B1* | 6/2017 | Saxe | G06N 3/04 |
| 9,773,166 B1* | 9/2017 | Connor | G06F 16/35 |
| 9,838,407 B1* | 12/2017 | Oprea | H04L 63/1416 |
| 10,169,581 B2 | 1/2019 | Tsao et al. | |
| 10,366,234 B2* | 7/2019 | Kuppa | G06F 21/563 |
| 10,681,080 B1 | 6/2020 | Chen | |
| 10,684,388 B2 | 6/2020 | Perkins et al. | |
| 2005/0120054 A1* | 6/2005 | Shulman | G06F 21/577 |
| 2006/0037076 A1* | 2/2006 | Roy | G06F 16/3329 726/22 |
| 2007/0233460 A1* | 10/2007 | Lancaster | G06F 40/47 704/9 |

(Continued)

OTHER PUBLICATIONS

Forcepoint.com, WebShells WebShells on the Web Server, pp. 1-8, https://www.forcepoint.com/blog/x-labs/webshells-webshells-web-server, May 2, 2013.*

(Continued)

*Primary Examiner* — Haresh N Patel
(74) *Attorney, Agent, or Firm* — Ashwin Anand; Gabriel Gonzalez

(57) ABSTRACT

Methods and systems for identifying malicious applications and, more particularly, to identifying web shell applications. Embodiments described herein rely on machine learning tools to analyze static and dynamic features of a suspected file to determine whether the file is a web shell application.

14 Claims, 7 Drawing Sheets

(56) References Cited

U.S. PATENT DOCUMENTS

| | | | |
|---|---|---|---|
| 2008/0319735 A1 | 12/2008 | Kambhatla et al. | |
| 2009/0070459 A1* | 3/2009 | Cho | H04L 63/1416 709/224 |
| 2009/0158430 A1 | 6/2009 | Borders | |
| 2009/0282474 A1* | 11/2009 | Chen | G06F 21/51 726/21 |
| 2010/0186088 A1* | 7/2010 | Banerjee | H04L 63/1441 726/23 |
| 2010/0229239 A1* | 9/2010 | Rozenberg | G06F 21/552 726/24 |
| 2010/0332920 A1* | 12/2010 | Ashida | G06F 9/451 714/57 |
| 2011/0167415 A1* | 7/2011 | Hayashida | G06F 8/441 717/142 |
| 2012/0016816 A1 | 1/2012 | Tanase et al. | |
| 2012/0317644 A1* | 12/2012 | Kumar | G06F 21/566 726/24 |
| 2013/0067579 A1* | 3/2013 | Beveridge | G06F 21/563 726/24 |
| 2013/0276114 A1 | 10/2013 | Friedrichs et al. | |
| 2013/0326625 A1* | 12/2013 | Anderson | G06F 21/566 726/23 |
| 2014/0047545 A1* | 2/2014 | Sidagni | G06F 21/577 726/25 |
| 2014/0123280 A1* | 5/2014 | Kedma | G06F 21/56 726/23 |
| 2014/0201838 A1* | 7/2014 | Varsanyi | G06F 21/552 726/23 |
| 2014/0279745 A1* | 9/2014 | Esponda | G06N 5/043 706/12 |
| 2014/0283037 A1* | 9/2014 | Sikorski | G06F 21/563 726/22 |
| 2015/0200961 A1* | 7/2015 | Landa | H04L 63/1441 726/23 |
| 2015/0222657 A1* | 8/2015 | Chu | G06F 21/566 726/23 |
| 2015/0256551 A1* | 9/2015 | Kang | H04L 67/10 726/23 |
| 2015/0264063 A1* | 9/2015 | Jenson | G06Q 20/4016 726/22 |
| 2015/0358343 A1* | 12/2015 | Segal | H04L 63/1425 726/23 |
| 2016/0055240 A1 | 2/2016 | Tur et al. | |
| 2016/0285835 A1* | 9/2016 | Linga | G06F 16/93 |
| 2016/0292418 A1* | 10/2016 | Wojnowicz | G06N 3/08 |
| 2016/0335435 A1* | 11/2016 | Schmidtler | G06F 21/562 |
| 2016/0366158 A1* | 12/2016 | Feng | H04L 63/145 |
| 2017/0026390 A1* | 1/2017 | Sofka | G06F 21/566 |
| 2017/0026391 A1* | 1/2017 | Abu-Nimeh | H04L 63/1433 |
| 2017/0075668 A1* | 3/2017 | Selvi | G06F 8/42 |
| 2017/0093886 A1* | 3/2017 | Ovcharik | H04L 63/145 |
| 2017/0124325 A1* | 5/2017 | Aime | G06F 21/564 |
| 2017/0262522 A1* | 9/2017 | Ranjan | G06F 21/53 |
| 2017/0359368 A1* | 12/2017 | Hodgman | H04L 63/1441 |
| 2018/0046798 A1* | 2/2018 | Zeller | G06F 21/53 |
| 2018/0082063 A1* | 3/2018 | Kuppa | G06F 21/565 |
| 2018/0181752 A1* | 6/2018 | Guri | G06F 21/566 |

OTHER PUBLICATIONS

"WebShells on the Web Server", Forcepoint.com, WebShells WebShells on the Web Server, pp. 1-8, https://www.forcepoint.com/blog/x-labs/ webshells-webshells-web-server, May 2, 2013.

* cited by examiner

IDENTIFYING WEB SHELL APPLICATIONS THROUGH LEXICAL ANALYSIS

The present application claims the benefit of pending U.S. utility patent application Ser. No. 15/268,523, filed on Sep. 16, 2016, and issued as U.S. Pat. No. 10,366,234, on Jul. 30, 2019, the entire disclosure of which is incorporated by reference as if set forth in its entirety herein.

TECHNICAL FIELD

This invention generally relates to methods and systems for identifying malicious applications and, more particularly, to automatically detecting web shell applications.

BACKGROUND

Due to their prevalence in today's society, the internet and other types of networks have become a hub for criminal activity. Often times cyber criminals or other type of threat actors attempt to install or otherwise implement web shell applications on unsuspecting systems.

In operation, web shells are uploaded to a target machine and used as a vector to exploit the target's systems. Web shells may exploit the target's systems by, for example, opening a connection from the target system to one or more outside services that allow an attacker to issue commands to the system. Web shells may additionally or alternatively modify the target system to facilitate other exploits, escalate privileges, and map the targeted system. If web shells are successful, they may allow threat actors to bypass security systems and gain unauthorized access to the system.

Existing techniques for combating web shells generally rely on a set of manually defined rules, traffic detection, or other existing information around attacks. For example, one existing technique generates a "signature" of a suspected application file and compares the signature to a database of known web shells. In other techniques, a sample of shells is taken, and heuristics are built based on common patterns. However, these techniques are highly vulnerable to shifts in attacker behavior or tools. Additionally, existing techniques often require the file to be running to discover if the file is malicious and to discover if it has affected a system.

A need exists, therefore, for methods and systems that can detect web shell applications that overcome the above mentioned disadvantages.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for identifying malicious applications. The method includes accessing, through an interface to a computer-readable medium, at least one file; extracting, using a configured processor, at least one feature related to the at least one file; providing, using the configured processor, the at least one feature to a classifier as input, wherein the classifier is configured to analyze the at least one feature to classify the at least one file as a web shell application or a non-web shell application; and receiving an identification of the file as a web shell application or a non-web shell application from the classifier.

In one embodiment, the method further includes extracting at least one static feature related to a first known web shell application; extracting at least one dynamic feature related to a second known web shell application; and training the classifier using the at least one extracted static feature and the at least one extracted dynamic feature.

In one embodiment, the at least one feature includes at least one of an index of coincidence, entropy rate, system function calls, behavior of the file when executed in a controlled environment, a graph of function calls within the file, and level of nesting of function calls.

In one embodiment, the method further includes removing the file from an affected system upon receiving an identification of the file as a web shell application or allowing the file to execute upon receiving an identification of the file as a non-web shell application.

In one embodiment, the classifier is configured to execute a gradient boosting technique to compare the file with a set of known web shell applications to classify the file as a web shell application or a non-web shell application.

In one embodiment, receiving an identification of the file as a web shell application or a non-web shell application includes receiving a probabilistic assessment of whether the file is a web shell application.

In another aspect, embodiments relate to a system for identifying malicious applications. The system includes an interface to a computer-readable medium configured to access at least one file; a memory; and a processor, the memory storing instructions configuring the processor to: extract at least one feature related to the at least one file; provide the at least one feature to a classifier as input; and execute the classifier receiving the at least one feature to provide an identification of the file as a web shell application or a non-web shell application as output.

In one embodiment, the system is further configured to extract at least one static feature related to a first known web shell application; extract at least one dynamic feature related to a second known web shell application; and train the classifier using the at least one extracted static feature and the at least one extracted dynamic feature.

In one embodiment, the at least one feature includes at least one of index of coincidence, entropy rate, system function calls, behavior of the file when executed in a controlled environment, a graph of function calls within the file, and level of nesting of function calls.

In one embodiment, the processor is further configured to remove the file from an affected system upon receiving an identification of the file as a web shell application or allowing the file to execute upon receiving an identification of the file as a non-web shell application.

In one embodiment, the classifier is configured to execute at least one of a gradient boosting technique and an Extra Trees technique to compare the file with a set of known web shells to classify the file as a web shell application or a non-web shell application.

In one embodiment, the classifier is configured to provide a probabilistic assessment of whether the file is a web shell application.

In yet another aspect, embodiments relate to a computer readable medium containing computer-executable instructions for performing a method for identifying malicious applications. The medium includes computer-executable instructions for accessing, through an interface to a computer-readable medium, at least one file; computer-executable instructions for extracting, using a configured processor, at least one feature related to the at least one file; computer-executable instructions for providing, using the configured processor, the at least one feature to a classifier as input, wherein the classifier is configured to analyze the at least one feature to classify the at least one file as a web shell application or a non-web shell application; and computer-executable instructions for receiving an identification of the file as a web shell application or a non-web shell application from the classifier.

In one embodiment, the computer readable medium further includes: computer-executable instructions for extracting at least one static feature related to a first known web shell application; computer-executable instructions for extracting at least one dynamic feature related to a second known web shell application; and computer-executable instructions for training the classifier using the at least one extracted static feature and the at least one extracted dynamic feature.

In one embodiment, the at least one feature includes at least one of an index of coincidence, entropy rate, system function calls, behavior of the file when executed in a controlled environment, a graph of function calls within the file, and level of nesting of function calls.

In one embodiment, the computer readable medium further includes computer-executable instructions for removing the file from an affected system upon receiving an identification of the file as a web shell application or allowing the file to execute upon receiving an identification of the file as a non-web shell application.

In one embodiment, the classifier is configured to execute at least one of a gradient boosting technique and an Extra Trees technique to compare the file with a set of known web shell applications to classify the file as a web shell application or a non-web shell application.

In one embodiment, receiving an identification of the file as a web shell application or a non-web shell application includes receiving a probabilistic assessment of whether the file is a web shell application.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
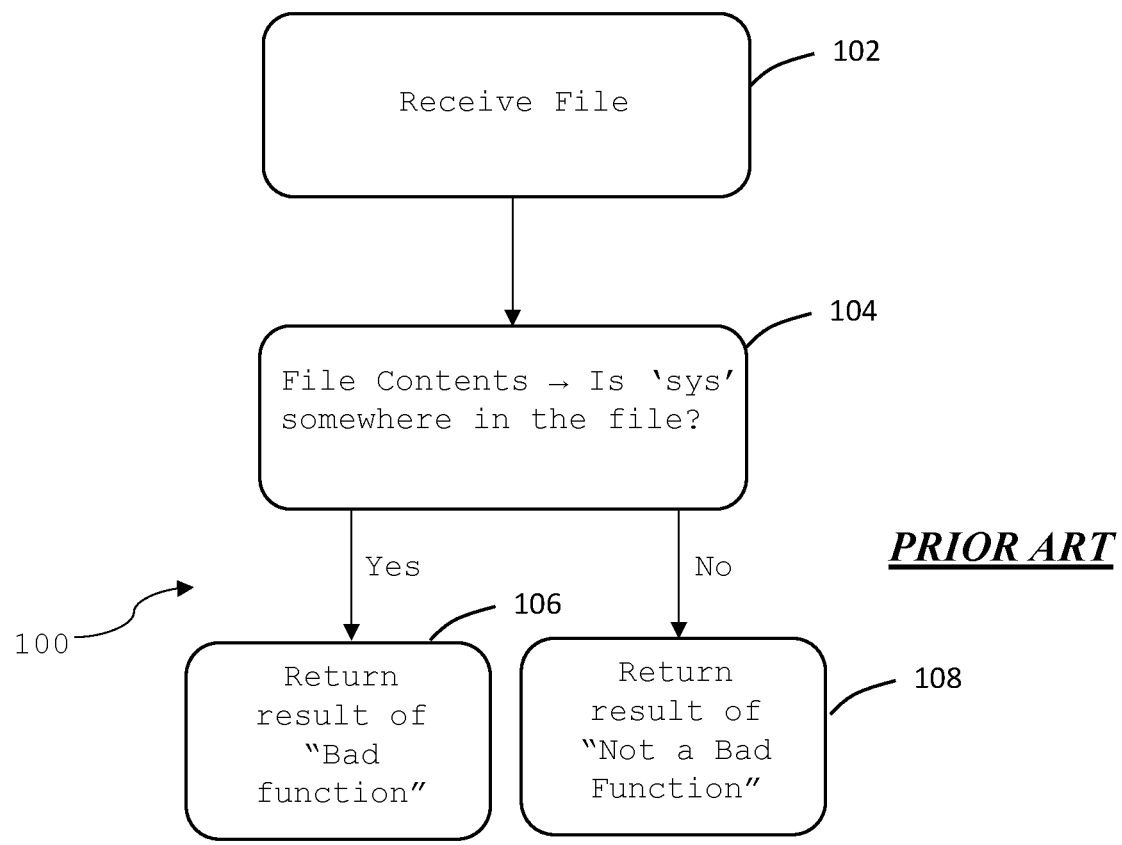
FIG. 1 depicts a flowchart of an existing technique for detecting web shells.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

As mentioned previously, existing techniques for detecting web shells generally rely on features such as interactions with the file and a file signature. FIG. 1 depicts a simplified flowchart of an existing technique 100 for detecting functions that are indicative of web shells. First, step 102 involves receiving a file. This technique 100 then inspects the content of the file in step 104. For example, this technique 100 may consider whether the character string "sys" is in the file, which may indicate a function. If the string "sys" is not in the file, then it may be concluded in step 106 that the file does not include a malicious or "bad" function (and therefore likely not a web shell).

If, on the other hand, the characters "sys" are in the file, then it may be concluded in step 108 that the file may include a malicious function and is likely a web shell. However, this technique may be inaccurate and return false positives. For example, a benign string such as "this is systemic" would present a malicious function because the string "sys" is detected.

Features of the present invention, in contrast, rely on machine learning and the analysis of static and dynamic features of the file itself. The extracted static and dynamic features may be integrated into a model using machine learning to output a classification of the application as a web shell (or a non-web shell).

Methods and systems of various embodiments of the invention may use a training set of known web shells to train a model. The training data may consist of a set of correctly-labeled applications (i.e., a list of web shell applications and non-web shell applications) along with a set of descriptive features about the identifier and a network-accessible resource associated with the identifier. The model may identify probabilistic patterns among the descriptive features that correspond with safe and malicious applications. Once these patterns have been learned, the model can accept new, unlabeled applications, and make an assessment as to the likelihood of each application being a web shell.

The designation of an application as a web shell may depend on one or more features present/absent in or associated with the file. The model may weigh each feature in relation to all of the other features provided to create a high-dimensional, adaptive threat profile that can then be employed to make accurate classifications of new applications.

Figure 2:
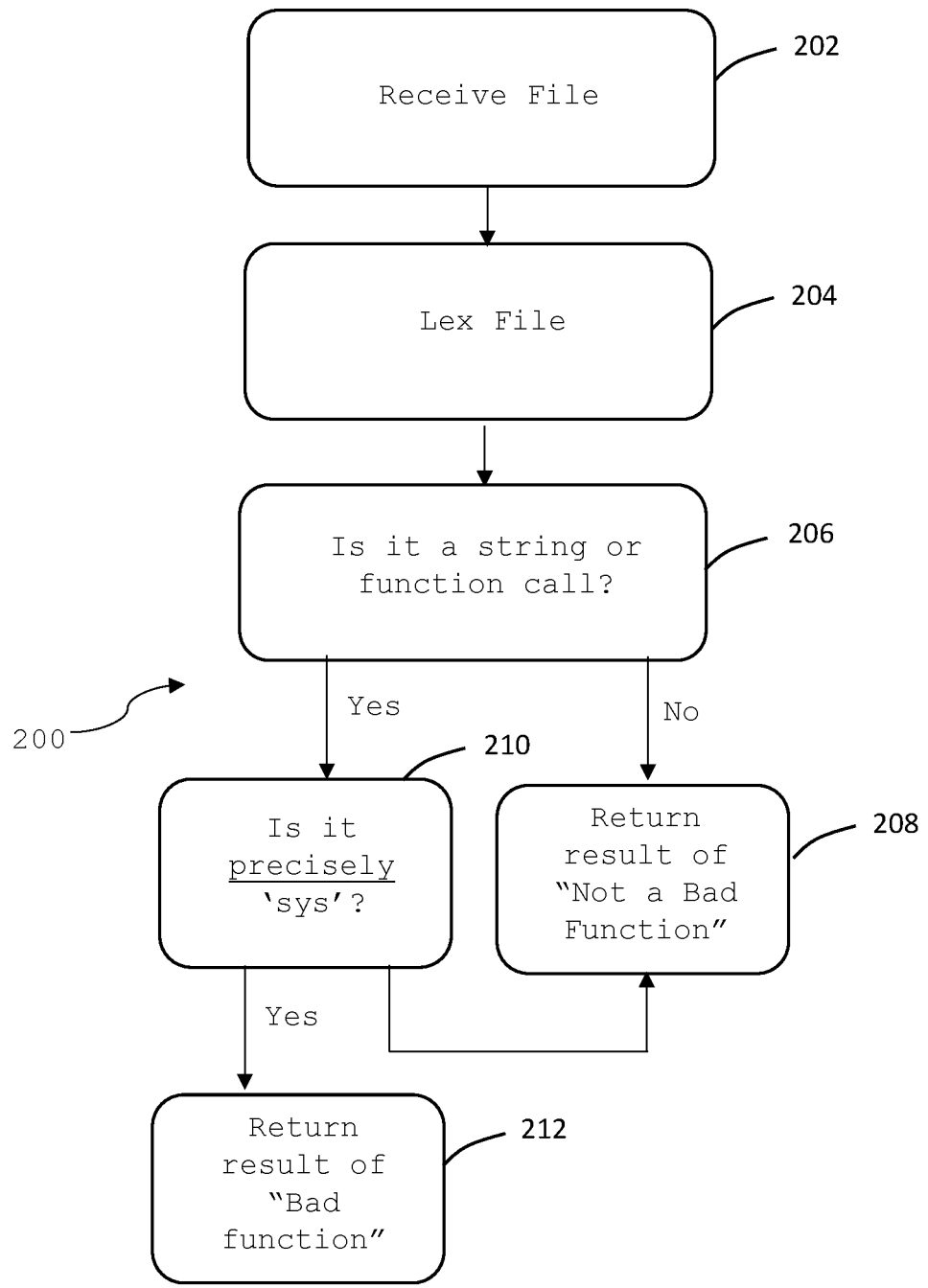
FIG. 2 depicts a flowchart of an improved technique for detecting web shells in accordance with one embodiment.

FIG. 2 illustrates an improvement to the existing technique 100 of FIG. 1. The improved, simplified technique 200 first involves receiving a file in step 202. Step 204 involves lexing, i.e., performing lexical analysis on a file's contents to turn its content into various syntactically meaningful tokens. The technique 200 may then, in step 206, consider whether or not the file includes a particular string or function call based on the lexed components. If not, it may be concluded in step 208 that the file does not include a malicious function and is therefore not a web shell. If, on the other hand, the file does contain a string or function call of interest, the technique 200 may further analyze the call in step 210. For example, the technique 200 may consider whether the lexed component is truly a call to a system function (i.e., a "sys" call) or merely a three-letter string occurring in a larger context. If yes, then the technique 200 may conclude in step 212 that the file includes a malicious function and is therefore likely a web shell. Accordingly, the lexing step 204 described here allows for a more accurate identification of function calls associated with web shells.

Figure 3:
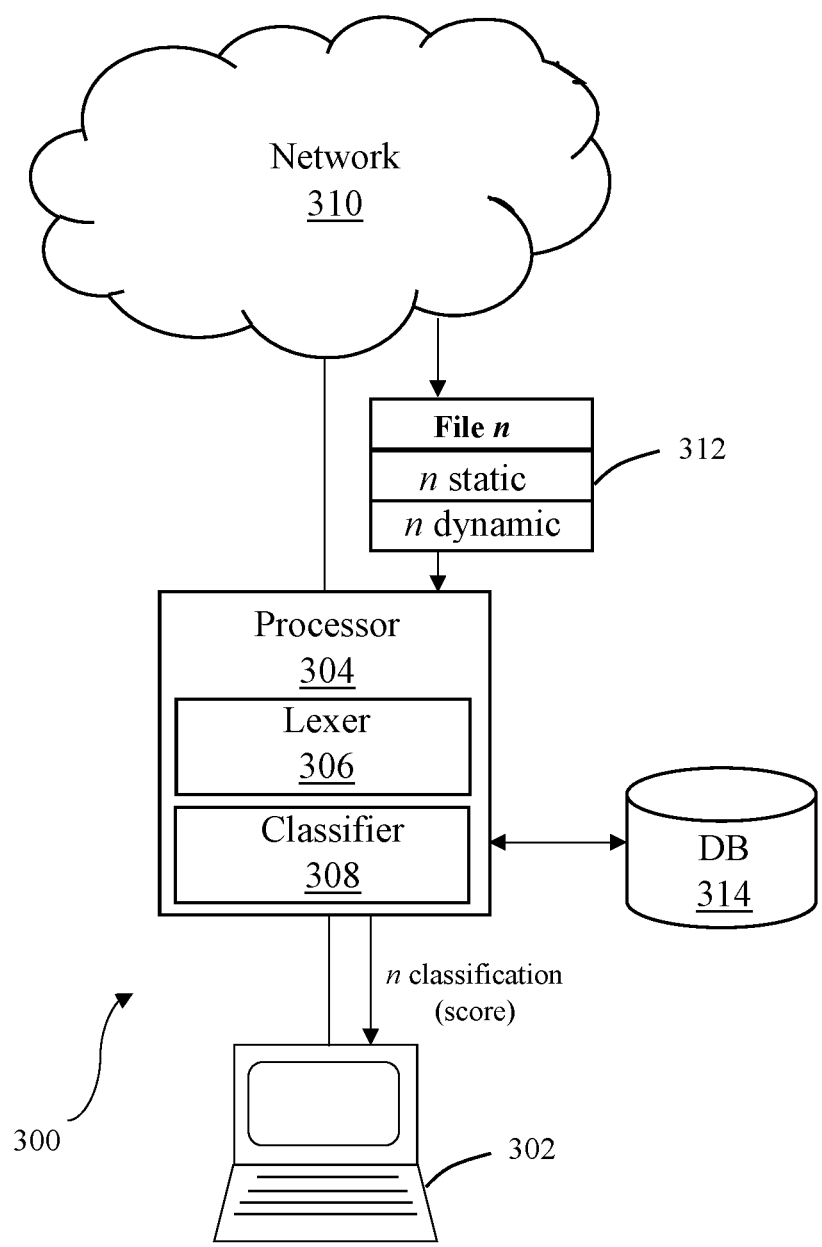
FIG. 3 illustrates a system for detecting web shells in accordance with one embodiment.

FIG. 3 illustrates a system 300 for detecting web shells in accordance with one embodiment. The system 300 may include an interface 302 to a computer-readable medium; a processor 304 with a lexer 306 and a classifier 308; and a communication network 310.

The user interface 302 may be implemented as a laptop, desktop, tablet, smartphone, or any other similar device connected to a network that may be at risk of receiving and/or executing malicious resources.

The processor 304 may be any hardware device capable of executing the lexer 306 and the classifier 306308 to classify a particular application as a web shell or a non-web shell. The processor 304 may be a microprocessor, a field programmable gate array (FPGA), an application-specific integrated circuit (ASIC), or other similar devices. In some embodiments, such as those relying on one or more ASICs, the functionality described as being provided in part via software may instead be configured into the design of the ASICs and, as such, the associated software may be omitted. The processor 304 may be configured as part of the user interface 302 (e.g., a laptop) or may be located at some remote location. That is, the processing of the classifier 308 may be done on a server at a remote location, and the output of the classifier 308 can be used to determine what is presented via the user interface 302, which in that embodiment is distinct from the server.

Figure 4:
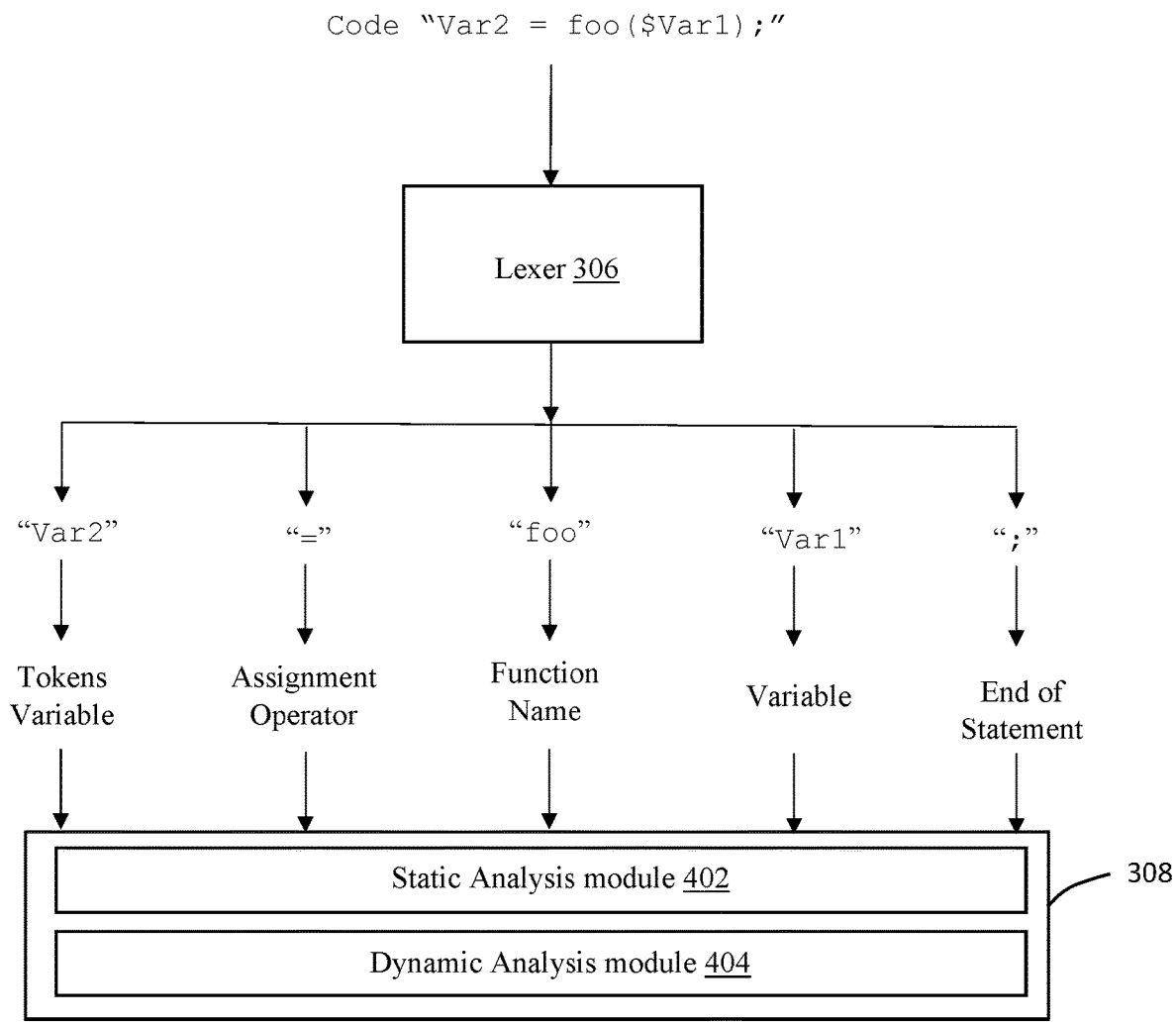
FIG. 4 depicts a flowchart of the lexer of FIG. 2 lexing a file in accordance with one embodiment.

The lexer 306 may be configured to "lex" incoming files to break them down into individual function calls and/or language elements. For example, FIG. 4 illustrates the lexer 306 breaking a file into individual function calls and language elements. A static analysis module 402 and a dynamic analysis module 404 of the processor 304 may then parse the lexed and un-lexed versions to extract statistical features and data about the file.

Referring back to FIG. 3, the network 310 may link various devices with each other and various types of files. The network 310 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network 310 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GS) link, a cellular digital packet data (CDPD) link, a Research in Motion, Limited (RIM) duplex paging type device, a Bluetooth radio link, or an IEEE 802.11-based link.

The exact type/configuration of the network 310 may vary as long as the processor 304 can analyze the static and dynamic features of particular files and make accurate classifications of said files. FIG. 3, for example, illustrates a file n 312 being transmitted to the processor 304 for analysis.

The system 300 may further include one or more databases 314 in communication with the processor 304. The database 314 may store information related to previous classifications of particular files, as well as other information related to processor execution and data training sets. The processor 304 may query the database 314 when appropriate to retrieve information related to a particular feature, for example.

Figure 5:
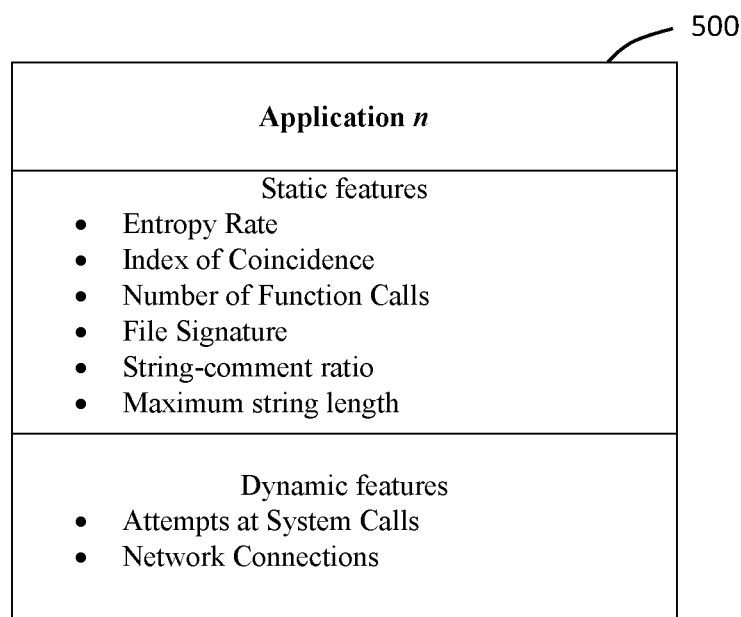
FIG. 5 illustrates a table listing exemplary static and dynamic features in accordance with one embodiment.

FIG. 5 depicts a table 500 showing exemplary static and dynamic features that may be considered when determining whether a file is a web shell or not. The list of static features is non-exhaustive and may include, for example, index of coincidence, entropy rate, number of calls to functions known to involve manipulating systems (as well as what those functions are), number of calls to functions known to involve opening connections, file signature, string-comment ratio, maximum string length, along with any combination thereof.

One or more of these features generally relate to the psychology of web shell authors. Programmers generally write code in accordance with certain standards and guidelines to, for example, make reviewing code easier. For example, programmers often include comments, use the same maximum string lengths, or the like. On the other hand, programmers generally do not write a file with, for example, only one line that includes hundreds of semicolons or write a file in which the entire content is a single, base-64 encoded string that is 10,000 bytes long.

Web shell authors may be hesitant to write the code in a clean and readable fashion to prevent a human reviewer from analyzing, reverse-engineering, and/or attacking the code. Accordingly, web shell authors may intentionally obfuscate their code (in which case the code is unreadable), as it may be nearly impossible for a human to detect these malicious function calls in an obfuscated file.

Various embodiments of the present invention can therefore take advantage of web shell authors' desire to write unreadable code or otherwise avoid good programming style. Features of the present invention can detect deviations from good programming style based on, e.g., the number of statements in each line of code, whether there is a function chain of a certain length, the type of functions, etc., to identify web shell applications.

For example, one static feature that may be calculated and considered in determining whether a particular application is a web shell is the entropy rate of a suspected file. The entropy rate (i.e., Shannon entropy) considers a range of values in relation to a test set of values. The entropy rate considers differences in distribution between the two sets. For example, clearly written (and non-malicious) code may be characterized by a first distribution of characters, whereas a web shell application may be characterized by a different distribution of characters.

Consider, as an example, the phrase "automatic web shell detection." The entropy rate may be calculated as:

For character "t":

$$\log_2\left(\frac{\text{Number of appearances of } t(4)}{\text{Total text length}(29)}\right)$$

This calculation may be repeated for any and all characters, and the results for each character summed to obtain the overall entropy rate. An entropy rate above a particular threshold may indicate that a particular application is a web shell (or at least likely to be a web shell).

Another static feature that may be analyzed in various embodiments is the index of coincidence. The index of coincidence analyzes file contents with respect to the alphabet. More specifically, the index of coincidence may analyze the number of times that characters appear in the same place in two distinct files. Accordingly, features described herein may compare the text of a suspicious file to a known web shell application (or a known non-web shell application). Similar indices of coincidence between the suspected file and the known web shell may indicate the suspected file is a web shell application (or at least likely a web shell application).

Another static feature that may be analyzed and considered is the string-comment ratio of the suspected application. For example, a high string-comment ratio may indicate the suspected application is a web shell application (or at least likely a web shell application).

Yet another static feature that may be analyzed and considered is the maximum string length of a suspected file. As mentioned previously, programmers generally use reasonable maximum string lengths when writing non-malicious code. On the other hand, web shell authors may, in an attempt to write obfuscated code, disregard this convention and write code containing excessively long string lengths. Accordingly, a file with string lengths above a certain length or threshold may indicate that a suspected file is a web shell.

In addition to the static features, the processor 304 may also consider dynamic features related to the suspected application. Analyzing dynamic features of a suspected application may involve running the suspected application in a testing environment (e.g., a "sandbox") and monitoring the application's activities. For example, the system 300 may monitor whether the sandboxed application attempts system calls or network connections.

The static and dynamic features may then be provided to a trained machine learning model to determine whether the file is a web shell application. The output from the classifier may include an identification of the file as a web shell application or a probabilistic assessment that the file is (or is not) a web shell application. For example, each analyzed feature may output a vote of whether or not said feature indicates the file is a web shell application and the individual votes may be aggregated to provide an overall result or estimate.

Various embodiments of the present invention may rely on various machine learning models and classifiers. For example, some embodiments may rely on a gradient boosting approach while others may rely on a random forest (Extra Trees) approach. These approaches generally involve creating a plurality of weak learners that are integrated or otherwise pooled together to form a strong ensemble classifier.

Figure 6:
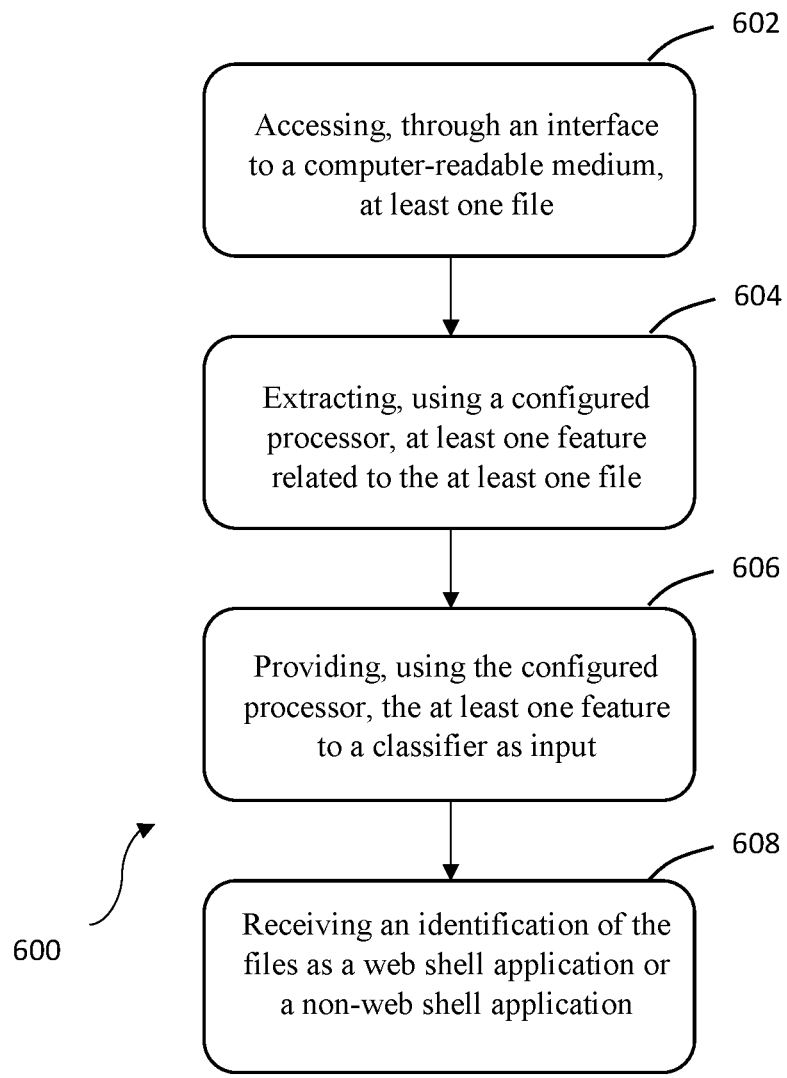
FIG. 6 depicts a flowchart of a method for identifying malicious applications in accordance with one embodiment.

FIG. 6 depicts a flowchart of a method 600 for identifying malicious applications in accordance with one embodiment. Step 602 involves accessing, through an interface to a computer-readable medium, at least one file. This interface may be similar to the interface 302 of FIG. 3, for example. The accessed file may be a file that is suspected of being a web shell application. Or, a plurality of files may be accessed at random whether or not they are suspected of being web shell applications.

Step 604 involves extracting, using a configured processor, at least one feature related to the at least one file. The configured processor may be similar to the processor 304 of FIG. 3. The at least one feature may include static features, dynamic features, or some combination thereof. Static features may include entropy rate (Shannon entropy), index of coincidence, string-comment ratio, maximum string length, or some combination thereof. This list is non-exhaustive and it is contemplated that other types of static features in addition to or in lieu of those mentioned here or throughout the application may be considered as well.

Dynamic features may relate to how the file behaves when executed (e.g. in a protected sandbox environment). For example, dynamic features considered may include attempts at system calls, attempts at network connections, or the like. This list is non-exhaustive and it is contemplated that other types of dynamic features in addition to or in lieu of those mentioned here or throughout the application may be considered as well.

Step 606 involves providing, using the configured processor, the at least one feature to a classifier as input. The classifier may be implemented as part of the processor 304 as illustrated in FIG. 3. The classifier may rely on any of a variety of machine learning techniques to classify files as web shells or non-web shells such as those discussed previously.

Step 608 involves receiving an identification of the file as a web shell or a non-web shell application. To arrive at this identification, the classifier may execute any of a variety of machine learning procedures that consider various static and dynamic features. If a particular application is identified as a web shell, a notification to that effect may be presented to IT security personnel or the like via the user interface 302 in the form of an audio-based alert, visual-based alert, a haptic-based alert, or some combination thereof. If a particular file is identified as a non-web shell, a notification to that effect may also be communicated to IT security personnel or other operator. In this case, no further investigation or action may be necessary.

Figure 7:
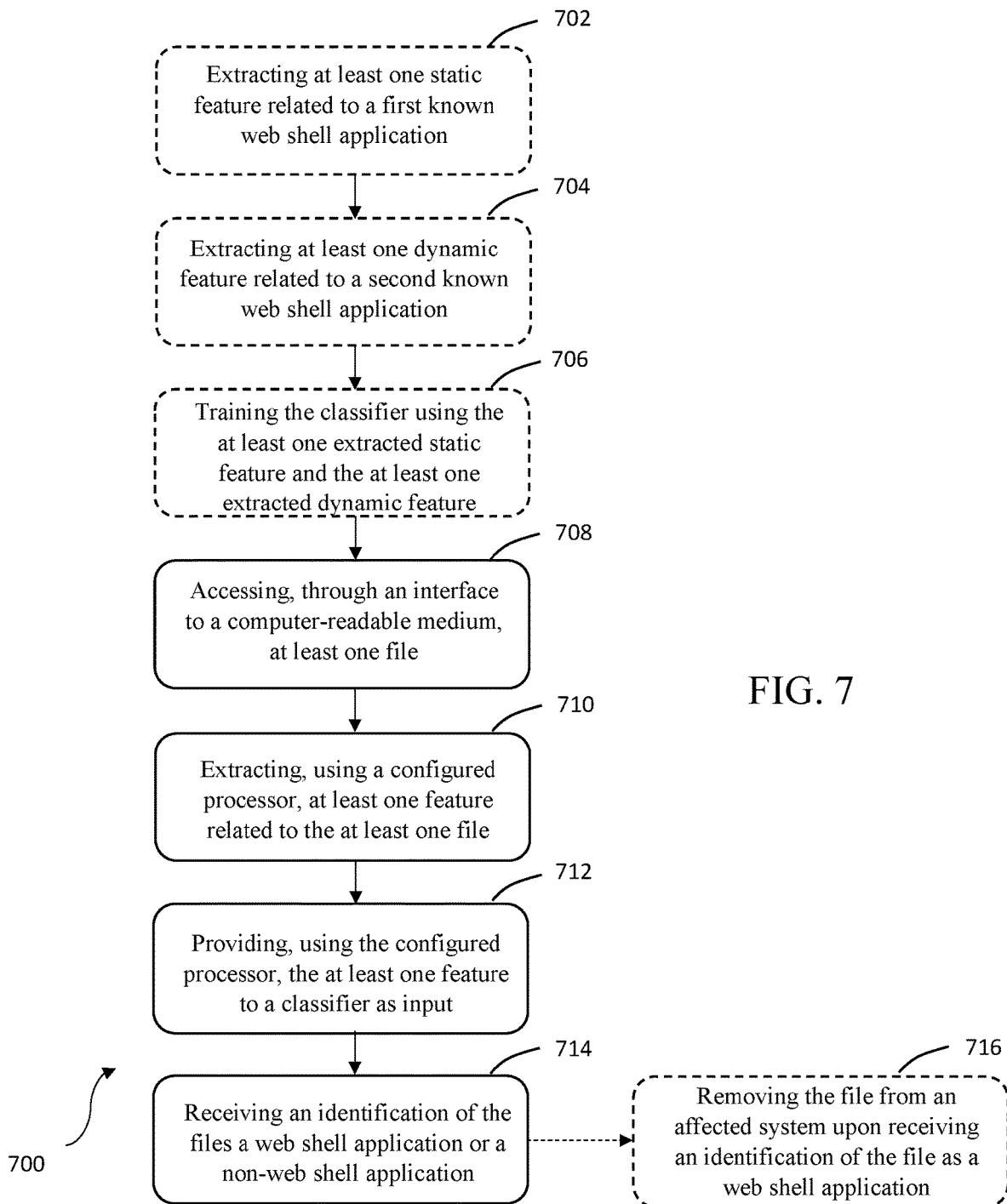
FIG. 7 depicts a flowchart of a method for identifying malicious applications in accordance with another embodiment.

FIG. 7 depicts a flowchart of a method 700 for detecting malicious applications in accordance with another embodiment. Optional steps 702, 704, and 706 involve training the system 300. Specifically, optional step 702 involves extracting at least one static feature related to a first known web shell application. The static feature(s) extracted may include one or more of index of coincidence, entropy rate, string-comment ratio, maximum string length, function calls within the file, level of nesting of (malicious) function calls, or the like.

Optional step 704 involves extracting at least one dynamic feature related to a second known web shell application. The dynamic feature(s) extracted may include one or more features related to the file's behavior when executed (e.g., in a sandbox environment). For example, the extracted dynamic feature may relate to whether or not the file attempts to establish a connection with a network or whether or not it attempts to call other functions.

Optional step 706 involves training the classifier using the at last one extracted static feature and the at least one extracted dynamic feature. These extracted features may be fed into a model to be used for future classifications. Information regarding the features and known web shells may be communicated to and stored in the database 314. The system may similarly be trained for applications/files known to not be web shells. In other words, these steps of method 700 may be repeated for benign or otherwise non-malicious files to further aid in training.

The input training data may consist of a set of correctly labeled files (i.e., a list of files labeled as web shells and/or a list of files labeled as non-web shells) along with a set of extracted, descriptive features associated with the file. The model may identify probabilistic patterns among the present features that correspond with the web shell labels and non-web shell labels.

Steps 708, 710, 712, and 714 of method 700 are similar to steps 602, 604, 606, and 608, respectively, of method 600 and are not repeated here. Optional step 716, however, involves removing the file from an affected system upon receiving an identification of the file as a web shell application. If web shells can be automatically identified from the extracted features, they can be nullified before they have the opportunity to cause harm. In the event they are already present on the scanned system, they can be identified much more readily, thereby easing the task of identifying if a breach has taken place and remediating a breach if one has occurred.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for identifying malicious applications, the method comprising:
    accessing an application file through an interface to a computer-readable medium;
    performing a lexical analysis on content of the application file, wherein the lexical analysis involves transforming the content of the application file into at least one individual letter or character;
    determining a number of occurrences of the individual letter or character;
    performing a calculation using the number of occurrences of the individual letter or character to determine at least one static feature related to the application file, wherein the at least one static feature comprises an entropy rate of the application file, and wherein the entropy rate is calculated based at least in part on a distribution of characters in the content of the application file;
    providing the at least one static feature to a classifier executing a machine learning procedure, wherein the classifier is trained to analyze, for at least some application files: (i) static features, and (ii) dynamic features related to monitored behavior of the at least some application files when executed, wherein the dynamic features include attempted system calls or attempted network connections; and
    receiving from the classifier a classification of the application file as a web shell.

2. The method of claim 1 wherein the at least one individual letter or character includes a syntactically meaningful token.

3. The method of claim 1 wherein the classifier is configured to execute a gradient boosting technique to compare the generated feature with a set of known web shells to classify the file as a web shell.

4. The method of claim 1, further comprising determining whether the at least one individual letter or character includes a particular string or function call.

5. The method of claim 1, wherein the at least one individual letter or character includes at least one individual function call.

6. The method of claim 1, wherein the at least one static feature includes a number of times a particular character appears in a same place as in a known web shell.

7. The method of claim 1 wherein the generated feature comprises a string-comment ratio of the application file.

8. A system for identifying malicious applications, the system comprising:
    an interface to a computer readable medium for accessing an application file;
    a memory; and
    a processor executing instructions stored on the memory to:
        perform a lexical analysis on content of the application file, wherein the lexical analysis involves transforming the content of the application file into at least one individual letter or character,
        determine a number of occurrences of the individual letter or character,
        perform a calculation using the number of occurrences of the individual letter or character to generate a feature related to the file determine at least one static feature related to the application file, wherein the at least one static feature comprises an entropy rate of the application file, and wherein the entropy rate is calculated based at least in part on a distribution of characters in the content of the application file,
        provide the at least one static feature to a classifier executing a machine learning procedure, wherein the classifier is trained to analyze, for at least some application files: (i) static features, and (ii) dynamic features related to monitored behavior of the at least some files when executed, wherein the dynamic features include attempted system calls or attempted network connections, and
        receive from the classifier a classification of the application file as a web shell.

9. The system of claim 8 wherein the at least one individual letter or character includes a syntactically meaningful token.

10. The system of claim 8 wherein the classifier is configured to execute a gradient boosting technique to compare the at least one static feature with a set of known web shells to classify the application file as a web shell.

11. The system of claim 8 wherein the processor is further configured to determine whether the at least one individual letter or character includes a particular string or function call.

12. The system of claim 8 wherein the at least one individual letter or character includes at least one individual function call.

13. The system of claim 8 wherein the at least one static feature includes a number of times a particular character appears in a same place as in a known web shell.

14. The system of claim 8 wherein the generated feature is a string-comment ratio of the application file.

* * * * *